(12) United States Patent
Frohlich et al.

(10) Patent No.: US 9,970,808 B2
(45) Date of Patent: May 15, 2018

(54) METHOD FOR ASCERTAINING A COMPENSATED FLOW AND/OR A COMPENSATED FLOW VELOCITY, ULTRASONIC, FLOW MEASURING DEVICE AND COMPUTER PROGRAM PRODUCT

(71) Applicant: Endress + Hauser Flowtec AG, Reinach (CH)

(72) Inventors: Thomas Frohlich, Munchenstein (CH); Oliver Berberig, Grenzach-Wyhlen (DE); Beat Kissling, Reinach (CH); Quirin Muller, Battwil (CH); Klaus Bussinger, Reinach (CH)

(73) Assignee: Endress + Hauser Flowtec AG, Reinach (CH)

( * ) Notice: Subject to any disclaimer, the term of this patent is extended or adjusted under 35 U.S.C. 154(b) by 126 days.

(21) Appl. No.: 14/898,197

(22) PCT Filed: May 19, 2014

(86) PCT No.: PCT/EP2014/060188
§ 371 (c)(1),
(2) Date: Dec. 14, 2015

(87) PCT Pub. No.: WO2014/198492
PCT Pub. Date: Dec. 18, 2014

(65) Prior Publication Data
US 2016/0131516 A1    May 12, 2016

(30) Foreign Application Priority Data
Jun. 12, 2013 (DE) .................. 10 2013 106 108

(51) Int. Cl.
*G01F 25/00* (2006.01)
*G01F 1/66* (2006.01)

(52) U.S. Cl.
CPC ............ *G01F 25/0007* (2013.01); *G01F 1/66* (2013.01); *G01F 1/667* (2013.01)

(58) Field of Classification Search
USPC ......................................... 73/1.16
See application file for complete search history.

(56) References Cited

U.S. PATENT DOCUMENTS

| | | | | |
|---|---|---|---|---|
| 5,546,812 A | * | 8/1996 | Drenthen | G01F 1/662 73/861.28 |
| 5,987,997 A | * | 11/1999 | Roskam | G01F 1/668 73/861.29 |

(Continued)

FOREIGN PATENT DOCUMENTS

| | | |
|---|---|---|
| DE | 19717940 A1 | 11/1998 |
| EP | 2228631 A1 | 9/2010 |

(Continued)

OTHER PUBLICATIONS

English Translation of International Preliminary Report on Patentability, WIPO, Geneva, Dec. 23, 2015.

(Continued)

*Primary Examiner* — Eric S McCall
*Assistant Examiner* — Mohammed E Keramet-Amircola
(74) *Attorney, Agent, or Firm* — Bacon & Thomas, PLLC

(57) ABSTRACT

A method for ascertaining a compensated flow and/or a compensated flow velocity, wherein the compensation of a flow related measurement error occurs in the context of a flow measurement with a two path measuring of an ultrasonic, flow measuring device, comprising: an arrangement of at least two ultrasonic transducers pairs on a tube, or pipe, wherein the ultrasonic transducers are in a 180°, two path, one traverse, or a 90°, two path, two traverse arrangement, by means of an evaluation unit of a flow measuring device and/or a computer, characterized by steps as follows: a) feeding information relative to the type of a flow influenc- (Continued)

ing, tube, or pipe, element into the evaluation unit and/or into the computer; b) feeding information relative to distance (xa-xd) of the arrangement of the ultrasonic transducer pairs from the flow influencing, tube, or pipe, element into the evaluation unit and/or into the computer; c) compensating a measurement error by means of a correction factor $k_D$ as a function of information from steps a) and b); and d) ascertaining a flow corrected by the correction factor $k_D$ and/or a flow velocity corrected by the correction factor $k_D$, as well as an ultrasonic, flow measuring device and a computer program product.

16 Claims, 6 Drawing Sheets

(56) References Cited

U.S. PATENT DOCUMENTS

| | | | | |
|---|---|---|---|---|
| 6,595,071 | B1* | 7/2003 | Doten | A61B 8/06 |
| | | | | 73/861.29 |
| 7,942,068 | B2 | 5/2011 | Ao et al. | |
| 9,279,707 | B2* | 3/2016 | Wiest | G01F 1/662 |
| 9,588,934 | B2* | 3/2017 | Murakami | G06F 15/00 |
| 2003/0131667 | A1* | 7/2003 | Gallagher | G01F 1/662 |
| | | | | 73/861.27 |
| 2005/0210999 | A1* | 9/2005 | Sylvia | G01F 1/662 |
| | | | | 73/861.29 |
| 2006/0201430 | A1* | 9/2006 | Davis | G01F 1/666 |
| | | | | 119/14.02 |
| 2009/0055119 | A1* | 2/2009 | Baumoel | G01F 25/0007 |
| | | | | 702/100 |
| 2010/0107776 | A1* | 5/2010 | Shanahan | G01F 1/60 |
| | | | | 73/861.11 |
| 2010/0139415 | A1* | 6/2010 | Berger | G01F 1/667 |
| | | | | 73/861.28 |
| 2010/0229654 | A1* | 9/2010 | Ao | G01F 1/667 |
| | | | | 73/861.31 |

FOREIGN PATENT DOCUMENTS

| | | |
|---|---|---|
| WO | 0149182 A2 | 7/2001 |
| WO | 2013164805 A1 | 11/2013 |

OTHER PUBLICATIONS

International Search Report,, EPO, The Netherlands, dated Aug. 5, 2014.
German Search Report, German PTO, Munich, dated Mar. 3, 2014.
"Simulation of flow meter calibration factors for various installation effects," Martin Holm et al., Institute of Measurement and Control, London, Bd. 15, Nr. 4, Jul. 1, 1995, pp. 235-244.

* cited by examiner

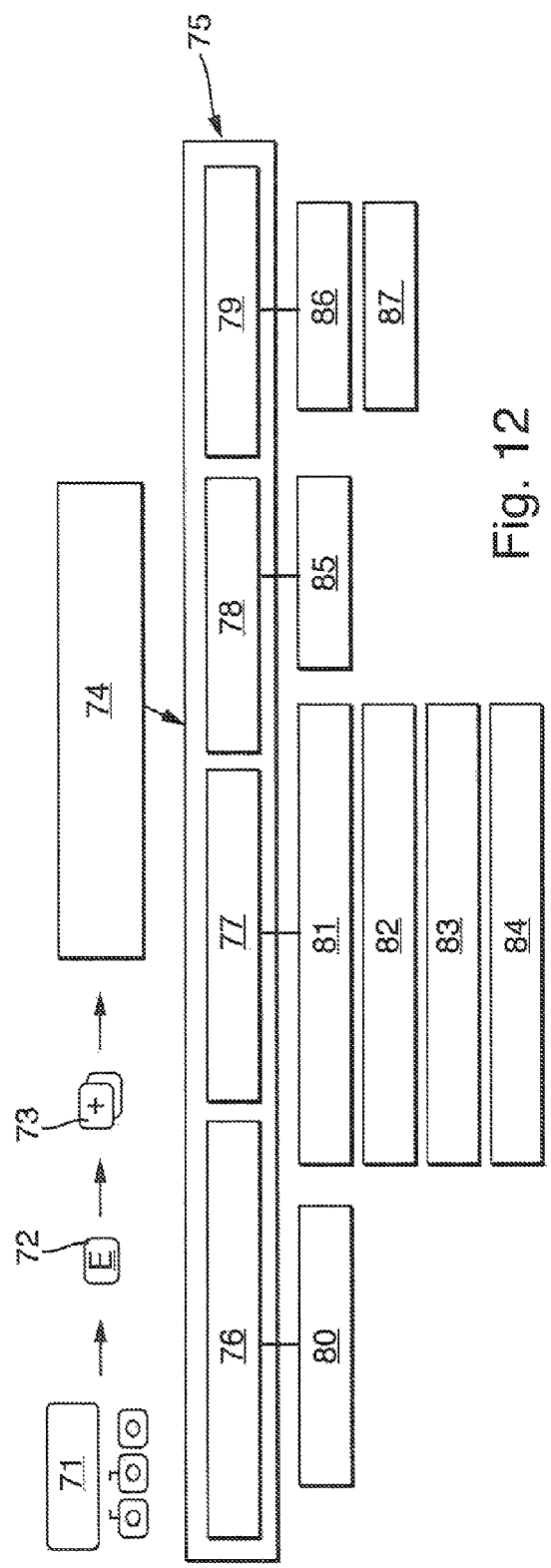

METHOD FOR ASCERTAINING A COMPENSATED FLOW AND/OR A COMPENSATED FLOW VELOCITY, ULTRASONIC, FLOW MEASURING DEVICE AND COMPUTER PROGRAM PRODUCT

TECHNICAL FIELD

The present invention relates to a method for ascertaining a compensated flow and/or a compensated flow velocity, wherein the compensation of a flow related measurement error occurs in the context of a flow measurement of an ultrasonic, flow measuring device. The present invention relates additionally to an ultrasonic, flow measuring device as well as to a computer program product.

BACKGROUND DISCUSSION

Known are calibration methods, which consider the type of disturbance, the distance to the disturbance and knowledge of how to reach a completely developed flow profile. A corresponding method is disclosed in US 2009/055119 A1. As a result of this, a flow measuring device is provided, which is preconditioned for a certain flow situation in the plant. This means that this flow measuring device is tuned for a certain flow situation and delivers in this situation a highly accurate measurement. As soon as the flow situation changes, thus the disturbance type and/or the distance to the disturbance, then the flow profile changes, so that the measuring device no longer works correctly. Therefore, the device is only applicable for the situation, for which it was calibrated in the plant.

German Patent DE 197 17 940 A1 describes the correction of a vortex intensity. Besides the vortex intensity, also a ratio between longitudinal impulse and rotational impulse in the medium is taken into consideration. A flow profile asymmetry is, in such case, not corrected. Thus, this correction method is limited to certain flow profile disturbances, namely vortices.

US 2003/0131667 A1 describes a method for compensating flow profile asymmetries and vortices with the assistance of flow conditioning systems. The flow conditioning systems e.g. tube bundle flow straighteners and/or perforated plates assure that defined flow conditions reign at the location of the ultrasonic flow measuring. In this way, a defined and exact flow measuring is enabled, however, while having to accept in the bargain high pressure losses and obstruction of the flow cross section. In this situation, e.g. a cleaning of the pipeline by means of a pig is impossible. Due to the pressure losses, also a significantly higher pumping power is required. The user is compelled, especially in comparison to clamp-on flow measuring devices, to open the pipeline, in order to install the flow conditioner.

U.S. Pat. No. 5,987,997 A describes a method for Reynolds number ascertainment by comparing flow velocities along five different measuring paths and the correction of the flow profile based on the ascertained values. Especially, these measuring paths must be distributed in a certain manner across the measuring cross section, since a different radial separation of the measuring paths is required. This method rests on ascertaining the velocity ratios of these measuring paths relative to one another. This is essential in the case of this method.

The intermediately published WO 2013/164805 A1 discloses an ultrasonic, flow measuring method, which corrects for flow disturbances and which requires the flow type, the position and the orientation specifications of the transducer pair. Thus, a high calibration effort is required, since the correction is composed of three independent parameters. Especially the orientation specifications in the case of a single path system are essential, in order to be able to perform a reliable correction. Even small deviations can lead here to a large error. Therefore, individual measurements with very small angle change, respectively step width, are required, in order to enable a sufficiently exact and flexible correction. In some cases it is not per se possible for the user to give an exact orientation specification for a disturbance, since the disturbance can be of complex nature or is unknown and the positioning of the transducer relative to the disturbance can, consequently, not be given exactly.

Clamp-on ultrasonic, flow measuring devices are known, which work using a so-called two path arrangement. This measuring occurs via two or more ultrasonic transducer pairs. This arrangement has the advantage that measurement inaccuracies in the case of not completely symmetric, especially not completely rotationally symmetric, flow profiles are partially compensatable. Sources for such disturbances are variable cross sections, branches, flow deflections and components, which are connected to a pipeline and those are considered as a component of a pipe, respectively as a pipe element. These include, among other things, elbows, valves or even pumps.

Depending on the type of the disturbance, a certain minimum separation is recommended for the arrangement of the ultrasonic transducers around the pipe, since otherwise a device-specific upper limit for the accuracy of measurement can no longer be assured.

There are, however, applications, in which this minimum separation, the so-called run-in distance, can not be maintained. In the case of such applications, large measurement errors occur as a result of the not completely developed flow profile. Here, however, the customer has also no information relative to the accuracy and reliability of the measuring, with which it can estimate and evaluate the quality of the ascertained information.

SUMMARY OF THE INVENTION

It is, consequently, an object of the present invention to provide customers an opportunity for estimating measurement inaccuracies, respectively measurement errors, in the case of the arrangement of ultrasonic transducers on tube or pipe installations having short run-in sections as well as to minimize measurement uncertainties by a correction.

The invention achieves this object and by providing an ultrasonic, flow measuring device, as well as also by a computer program product.

According to the invention, a method for ascertaining a compensated flow and/or a compensated flow velocity, wherein the compensation of a flow related measurement error occurs in the context of a flow measurement with a two path measuring of an ultrasonic, flow measuring device, wherein the ultrasonic transducers (12-14, 22-24) are in a 180°, two path, one traverse, or a 90°, two path, two traverse arrangement, by means of an evaluation unit of a flow measuring device and/or a computer, comprises steps as follows:
  a) feeding information relative to the type of a disturbance causing, tube, or pipe, element into the evaluation unit and/or into the computer;
  b) feeding information relative to distance of the arrangement of the ultrasonic transducer pairs from the disturbance causing, tube, or pipe, element into the evaluation unit and/or into the computer;

c) ascertaining a correction factor $k_D$ as a function of information from steps a) and b); and d) ascertaining a flow corrected by the correction factor $k_D$ and/or a flow velocity corrected by the correction factor $k_D$, A 180°, one traverse arrangement means, in such case, such as shown in FIG. 2, variant B, the arrangement in a plane, of two ultrasonic transducer pairs, which transmit and receive direct and crossover ultrasonic signals. This corresponds in variant B of FIG. 2 to the transducers 22 and 23 as the first transducer pair and the transducers 24 and 25 as the second transducer pair.

A 90°, two traverse arrangement means, in such case, such as shown in FIG. 2, variant A, the arrangement of two ultrasonic transducer pairs in two planes arranged at right angles to one another, wherein the ultrasonic signals are sent and received via a reflection on the tube inner wall. This corresponds in variant A of FIG. 2 to the transducers 12 and 13 as first transducer pair and the transducers 14 and 15 as second transducer pair.

Involved is a two path measuring with at least two or, in given cases, also more ultrasonic transducer pairs, since in the case of ascertaining a correction factor with only one ultrasonic transducer pair attention must always be paid to the angular position—thus the positioning of the ultrasonic transducer pair on the periphery of the tube. This dependence can be recognized, among others, also from FIG. 4. By taking into consideration this correction factor into the ascertaining of the flow and/or the flow velocity, a compensation of the flow related measurement error is achieved.

The method can be performed directly on the flow measuring device or as a computer simulation.

In a step a), there occurs the feeding of information relative to the type of a disturbance causing, tube, or pipe, element. The type of the disturbance causing, tube, or pipe, element can be specified by a selection.

In step b), there occurs the feeding of information relative to the distance of the arrangement of the ultrasonic transducer pair or the ultrasonic transducer pairs from the disturbance causing tube, or pipe, element. This can involve a measuring, e.g. laser measurement, wherein the measuring device transmits the distance directly to the flow measuring device. It can, however, also occur via manual input.

In step c), the correction factor is ascertained. In such case, data is used, which were ascertained e.g. by measurements and/or simulation method as a function of information provided in steps a) and b). In such case, in the case of intermediate values, an approximation can occur.

In step d), the ascertaining of the compensated measured value of the flow and/or the flow velocity occurs. This compensated value can then be output.

The 180°, one traverse arrangement or a 90°, two traverse arrangement can be utilized, especially in the form of a mounting arrangement, for ascertaining the correction factor $k_D$. In such case, preferably the mounting arrangement is used, so that an exact ascertaining or taking into consideration of the relationship between disturbance and measuring path orientation is unnecessary.

Fundamentally, just the statement of the correction factor can give a customer information relative to the inaccuracy of the measuring. It is, however, advantageous, when a corrected volume flow is calculated as a function of the correction factor $k_D$.

Additionally, the ascertaining of a maximum fluctuation width of the correction factor $k_D$ dependent on measurement error can occur. In case the measurement error on average amounts to 5%, then it can still have an additional standard deviation, for example, 1%. This accuracy specification can be given e.g. in the specification of the measuring device.

It is additionally advantageous, when a feeding of information relative to Reynolds number and/or kinematic viscosity of a medium to be measured into the evaluation unit and/or into the computer occurs, wherein this information is utilized in ascertaining the measurement error dependent correction factor $k_D$.

The dependence of the measuring path angular position to the flow disturbance can be compensated in the case of application of two or more ultrasonic transducer pairs by the measurement results of the one or more additional ultrasonic transducer pairs.

In a preferred embodiment of the invention, exclusively the type of flow influencing, tube, or pipe, element and the distance of the arrangement of the ultrasonic transducer pairs (12-15, 22-25) from the flow influencing, tube, or pipe, element (6a-6d) as well as optionally the information relative to the Reynolds number and/or the kinematic viscosity of a medium to be measured are taken into consideration for ascertaining the correction factor $k_D$. Thus, a maximum of two absolutely prescribed correction variables and two optional correction variables are utilized.

Other correction variables—especially a knowledge as regards the orientation of the ultrasonic transducer pairs (12-15, 22-25) relative to the disturbance—are not required.

Additionally, a feeding of information concerning the arrangement of the ultrasonic transducer pairs relative to one another on the tube, or pipe, element, especially information as regards the angle of the ultrasonic pairs relative to one another can occur, wherein the vertex of the angle is arranged on the tube axis and/or information as regards the number of traverses of an ultrasonic signal between the ultrasonic transducers of an ultrasonic transducer pair is provided, wherein this information is used in ascertaining of the measurement error dependent correction factor $k_D$. In this way, the measurement error fluctuation can be reduced.

The ascertaining of the measurement error dependent correction factor $k_D$ can occur advantageously by a simulation algorithm, for example, in the form of flow simulation calculations. This reduces the time consumed, which occurs, for example, in the case of comparative measurements, significantly.

Alternatively or supplementally, the ascertaining of the measurement error dependent correction factor $k_D$ can occur by comparison of the fed-in information with measurements, which are furnished in a data memory of the ultrasonic, flow measuring device or in a connected computer, or which can be queried from a server. This has the advantage that an approximation fitting the application as closely as possible can occur. The aforementioned comparison can advantageously include an interpolation in the measurements, to the extent that the measuring conditions in the measurements do not completely correlate with the fed-in information. In this way, also intermediate values can be better matched to real conditions.

The type of the disturbance causing, tube, or pipe, element is advantageously selected from the following group: angular tube, or pipe, elbow, especially with a 90° bend or a double or more, out of plane elbow, branches, pumps, sensor elements, valves, taperings narrower and/or wider.

According to the invention, an ultrasonic, flow measuring device includes an evaluation unit and at least two ultrasonic transducer pairs, which are arranged on a tube, or pipe, wherein the ultrasonic transducers are in a 180°, two path, one traverse, or a 90°, two path, two traverse arrangement and wherein the evaluation unit is embodied for ascertaining a measurement error compensated, measured value for a multipath measuring, especially by means of a method as claimed in one of the preceding claims, wherein the ascertaining includes steps as follows:

a) feeding information relative to the type of a disturbance causing, tube, or pipe, element into the evaluation unit and/or into the computer;
b) feeding information relative to the distance of the arrangement of the ultrasonic transducer pairs from the disturbance causing, tube, or pipe, element into the evaluation unit and/or into the computer;
c) ascertaining a measurement error dependent correction factor $k_D$ as a function of information from steps a) and b), and
d) ascertaining a flow corrected by the correction factor $k_D$ and/or a flow velocity corrected by the correction factor $k_D$ The correction factor can be displayed along with the measurement results and serves for compensation of the measured value.

The ultrasonic, flow measuring device, is especially advantageous when embodied as a clamp-on, ultrasonic, flow measuring device. This enables a very simple arrangement of the measuring device, reaction freely to the flow, in the region of the flow with the disturbed flow profile and enables additionally an orientation and mounting of the ultrasonic transducer without blocking of the flow, respectively interruption of the process, during the installation of the measuring device.

The ultrasonic transducers are arranged according to the invention in such a manner around the tube, or pipe, that the ultrasonic transducers are in a 180°, two path, one traverse, or a 90°, two path, two traverse arrangement.

Alternatively or supplementally for implementing the method in an ultrasonic, flow measuring device, the method can, for example, also be implemented in a computer program product, which can provide the customer, for example, a prediction of the measurement results as a result of certain flow conditions before an actual buy decision and can support the customer in the making of a buy decision. For ascertaining a correction factor $k_D$ for a multipath measuring, steps as follows are applied:

a) feeding information relative to the type of a disturbance causing, tube, or pipe, element (6a-6d) into the evaluation unit (11, 21) and/or into the computer;
b) feeding information relative to the distance ($x_a$-$x_d$) of the arrangement of the ultrasonic transducer pairs (1, 2, 12-15, 22-25) from the disturbance causing, tube, or pipe, element (6a-6d) into the evaluation unit (11, 21) and/or into the computer;
c) ascertaining a correction factor $k_D$ as a function of information from steps a) and b).

The correction factor ascertained by the computer program can be utilized for ascertaining the measurement error compensated, measured value according to step d) of claim 1 and 12. The ascertaining of the correction factors occurs analogously to steps a) and c) of claims 1 and 12.

BRIEF DESCRIPTION OF THE DRAWINGS

Preferred embodiments of the invention will now be explained in greater detail based on the appended drawing, the figures of which show as follows:

FIG. 12 shows a flowchart relative to input parameters for a computer program product.

DETAILED DISCUSSION IN CONJUNCTION WITH THE DRAWINGS

Figure 1:
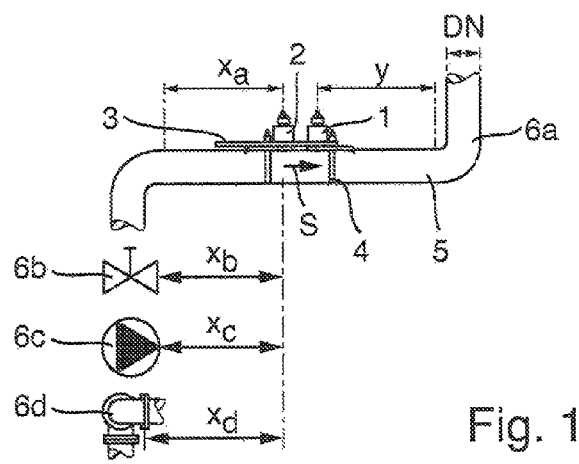
FIG. 1 is a schematic representation of a clamp-on variant of an ultrasonic flow measuring device spaced from various flow disturbances.

Ultrasonic, flow measuring devices are widely applied in process and automation technology. They permit simple determination of volume flow and/or mass flow in a pipeline. Known ultrasonic, flow measuring devices frequently work according to the travel-time difference principle. In such case, the different travel times of ultrasonic waves, especially ultrasonic pulses, so-called bursts, are evaluated relative to the flow direction of the liquid. For this, ultrasonic pulses are sent at a certain angle relative to the tube axis both with, as well as also counter to, the flow. Since the propagation velocity of sound waves against the flow direction is smaller than in the flow direction, there arises a travel-time difference. This travel-time difference is directly proportional to the flow velocity. From the travel-time difference, the flow velocity can be determined and therewith in the case of known diameter of the pipeline section the volume flow.

The signals are sent bidirectionallly, i.e. a given ultrasonic transducer works both as sound emitter as well as also as sound receiver.

The ultrasonic waves are produced, respectively received, with the assistance of so-called ultrasonic transducers. For this, ultrasonic transducers are placed fixedly in the wall of the relevant pipeline section. Also clamp-on, ultrasonic, flow measuring systems are available. In the case of these clamp-on systems, the ultrasonic transducers are pressed externally of the measuring tube or pipeline on its tube, or pipe, wall. A great advantage of clamp-on, ultrasonic, flow measuring systems is that they do not contact the measured medium and can be placed on an already existing pipeline.

Ultrasonic transducers are normally composed of an electromechanical transducer element, e.g. a piezoelectric element, and a coupling layer. The ultrasonic waves are produced as acoustic signals in the electromechanical transducer element and guided via the coupling layer to the tube wall and from there into the liquid in the case of clamp-on systems, or, in the case of inline systems, they are in-coupled via the coupling layer into the measured medium. In that case, the coupling layer is also, not so frequently, called the membrane.

Arranged between the piezoelectric element and the coupling layer can be another coupling layer, a so called adapting, or matching, layer. The adapting, or matching, layer performs, in such case, the function of transmitting the ultrasonic signal and simultaneously reducing a reflection on bounding layers between two materials caused by different acoustic impedances.

The ultrasonic transducer can be arranged in different ways. In the case of a mounting for a measuring via one traverse, the ultrasonic transducers are located on oppositely lying sides of the pipeline.

In the case of a mounting for a measuring via two traverses, the ultrasonic transducers are located on the same side of the pipeline.

Fundamentally, the calculating of the volume flow in the case of known travel-time difference in the case of a single ultrasonic transducer pair with the ultrasonic transducers a and b occurs according to the following formula:

$$Q = v * A$$

wherein:
Q=volume flow,
v=flow velocity of the medium and
A=tube cross sectional area $$v \sim \Delta t,$$

and $$\Delta t = t_a - t_b$$

wherein $t_a$ is the travel time between ultrasonic transducers a and b and $t_b$ is the travel time between ultrasonic transducers b and a.

An ultrasonic measuring location can be operated in so-called two channel-measurement operation. A single measurement transmitter, respectively a single evaluation unit, is capable of operating two measurement channels (measurement channel 1 and measurement channel 2) independently of one another. Each measurement channel has its own ultrasonic transducer pair. Both measurement channels work independently of one another and are supported equally by the one evaluation unit. This two channel-measurement operation can be applied for the following kinds of measurements:

two channel measuring=flow measurement at two separate measuring points two path measuring=redundant flow measurement at one measuring point Two path measuring will now be discussed in greater detail:

In the case of two path measuring, the flow is redundantly registered at one measuring point. The measured values of the two measurement channels can be differently processed and displayed.

The following measured value outputs are preferred for a two path measuring:

output the individual measured values per measurement channel (independently of one another)

output the average value of the two measured values

The function "average formation" provides, as a rule, a more stable measured value. The function is suited, consequently, for measurements under non-ideal conditions (e.g. short run-in section).

The configuration of the two measurement channels can occur individually. This enables an independent adjusting and selection of the display, the outputs, the measuring transducer type and the installation type for each measurement channel. In the case of two path measuring, an individual configuration of the two measurement channels is, as a rule, not necessary. In certain cases, it can, however, be utilized for equalizing application specific asymmetries.

FIG. 1 shows different ways in which application-specific asymmetries can arise.

FIG. 1 shows partially a clamp-on, ultrasonic, flow measuring device in a so-called two-traverse arrangement of two ultrasonic transducers 1 and 2 on a pipeline 5 with a fixed nominal diameter DN. In the case of such an arrangement, an ultrasonic signal sent from the first ultrasonic transducer 1 travels via the pipe wall into the medium, is reflected on the oppositely lying side on the inside of the pipe, and is then received by a second ultrasonic transducer. In such case, the two ultrasonic transducers are arranged next to one another on the measuring pipe wall, thus on the same line, which extends parallel to the pipe axis.

The ultrasonic transducers 1 and 2 are attached in the present example of an embodiment in per se known manner via one or more coupling adapters 3 by means of metal bands 4.

The bend 6a—here a 90° pipe elbow—represents a disturbance of the flow profile, which forms an asymmetry in the flow profile, which is shown in detail in FIGS. 4a and 4b and is explained in greater detail in connection with this figure. To the extent that a disturbance is subsequently discussed, then meant therewith is a disturbance of the flow profile.

Other pipe elements, which bring about disturbances, are shown in FIG. 1. In such case, such include valves 6b, pumps 6c and other bends 6d or, in given cases, also reducer pieces. This list of disturbance causal, pipe, elements, respectively components, is, of course, not exclusive.

The distances $x_{a\text{-}d}$ and y define recommended distances, in which the clamp-on, ultrasonic transducer 1 and 2 should be arranged on the pipeline 5 from the corresponding disturbances.

These distances are minimum distances and depend on the type of the disturbance. Thus, for $x_a$ and $x_d$ a minimum distance of 15*DN, thus 15-times nominal diameter, away from the disturbance in the flow direction S is recommended. For $x_b$ and $x_c$ a minimum distance of 20*DN from the disturbance is recommended. The minimum distance y—, to the extent that the disturbance is thus produced downstream from the ultrasonic transducers in the flow direction S—amounts to preferably, for instance, 3*DN.

Figure 2:
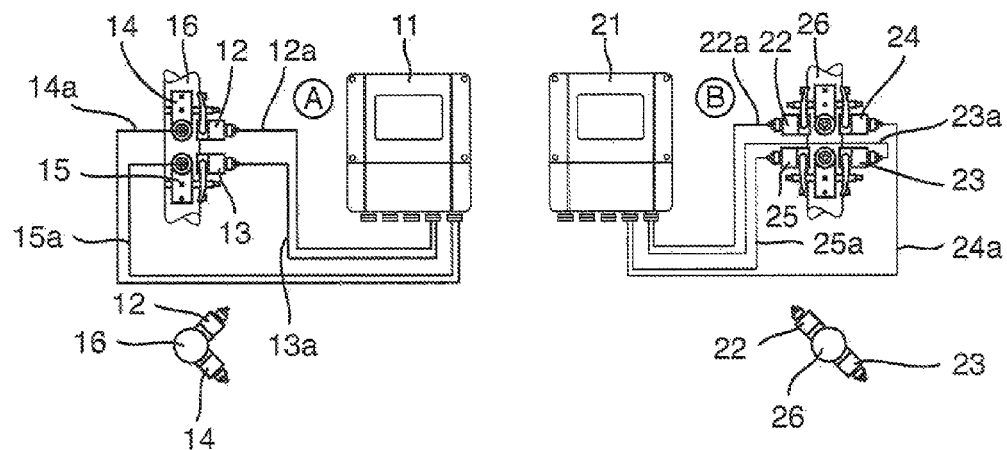
FIG. 2 is a schematic representation of two variants of a clamp-on, two path measurement including wiring and evaluation unit.

FIG. 2 shows a clamp-on, ultrasonic, flow measuring device in two two-path arrangements known per se.

Variant A is a two path, two traverse arrangement. The ultrasonic, flow measuring device includes an evaluation unit 11, to which two ultrasonic transducer pairs comprising the ultrasonic transducers 12, 13 and 14, 15 are connected. These are connected with the evaluation unit via the lines 12a, 13a and 14a, 15a.

The ultrasonic transducers 12, 13 of a first ultrasonic transducer pair are arranged next to one another on a line on the tube, or pipe, circumference of the tube, or pipe, 16, wherein the line extends parallel to the tube, or pipe, axis.

The ultrasonic transducers 14 and 15 of a second ultrasonic transducer pair are arranged circumferentially displaced relative to the first ultrasonic transducer pair. In such case, the circumferentially displaced arrangement of the second ultrasonic pair occurs preferably at a 90° angle relative to the first ultrasonic pair, wherein the vertex of the angle lies on the tube, or pipe, axis.

The ultrasonic transducer pairs are placed in a two-traverse arrangement around the pipe 16, which means the ultrasonic signal has a first signal path section with a first direction vector, is reflected on the tube, or pipe, inner wall and has a second signal path section with a second direction vector, which is unequal to the first direction vector.

The corresponding 90° arrangement of the ultrasonic transducer pairs is shown in FIG. 2 in a cross-sectional view of the tube, or pipe, 16.

Variant B is a two path, one traverse arrangement. The ultrasonic, flow measuring device includes an evaluation unit 21, to which two ultrasonic transducer pairs comprising the ultrasonic transducers 22, 23 and 24, 25 are connected. These are connected via the lines 22a, 23a and 24a, 25a with the evaluation unit.

The ultrasonic transducers 22, 23 of a first ultrasonic transducer pair are arranged on oppositely lying sides of the tube, or pipe, 26. They are arranged at an angle of 180° relative to one another and offset from one another parallel to the direction of the tube, or pipe, axis. An ultrasonic signal transmitted inclined in the medium is directly received without reflection. One speaks, consequently, of a one traverse arrangement.

The ultrasonic transducers 24 and 25 of a second ultrasonic transducer pair are arranged circumferentially displaced relative to the first ultrasonic transducer pair. In such case, the circumferentially displaced arrangement of the second ultrasonic pair occurs preferably at a 180° angle relative to the first ultrasonic pair, wherein the vertex of the angle lies on the tube, or pipe, axis.

The corresponding arrangement of the ultrasonic transducer pairs is shown in FIG. 2 in a cross sectional view of the tube, or pipe, 26.

One and two traverse arrangements and their arrangement for two path measuring already belong to the state of the art.

Figure 3:
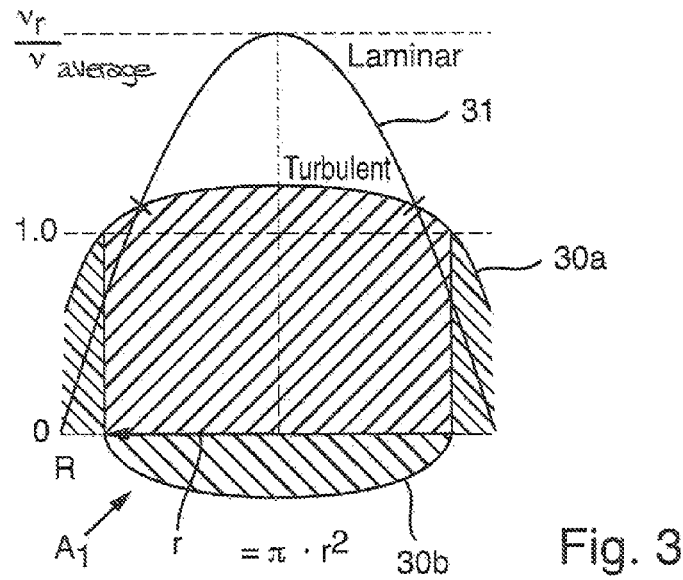
FIG. 3 is a representation, in the axial direction, of completely symmetrically formed, laminar and turbulent flow profiles.

FIG. 3 shows a graph of an undisturbed flow profile of a measured medium in a pipe in the case of a fully developed turbulent flow (hatched region) and a fully developed laminar flow (just the curve). The velocity of the medium points upwardly in the z-direction, while the radius of the tube, or pipe, is the x-axis. In such case, the area 30b refers to that region, in which the local velocities are greater than the average velocity, thus $v_r/v_{average} \geq 1$. In the region 30a, in contrast, $V_r/V_{average} < 1$.

Figure 4A:
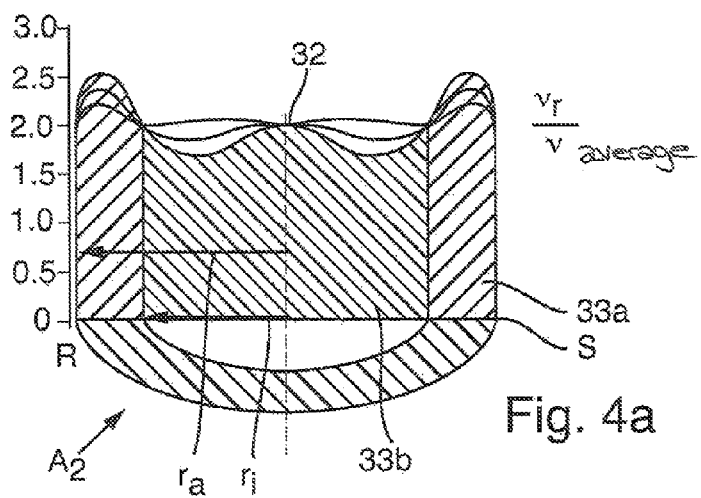
FIG. 4a is a representation, in the axial direction, of a disturbed flow profile after disturbance by a 90° bend.

FIG. 4a shows an example of a disturbed flow profile 32 of a measured medium in a tube, or pipe. Such a disturbed flow picture forms, for example, when a 90° tube, or pipe, bend is arranged about 5 D upstream from the measuring point. The velocity of the medium again points upwardly in the z-direction, while the radius of the tube, or pipe, is the x-axis. In such case, the area 33b refers to the region, in which the local velocities are less than the average velocity, thus $V_r/V_{average} < 1$. In the region 33a, in contrast, $V_r/V_{average} \geq 1$.

Figure 4B:
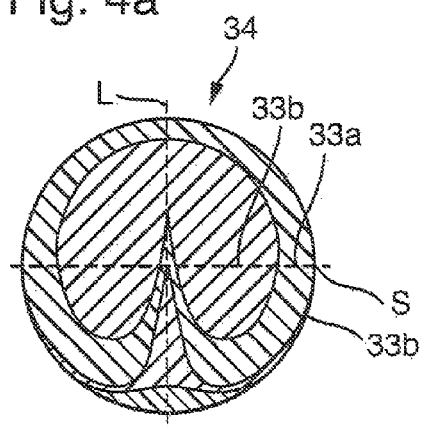
FIG. 4b is a representation of the velocity distribution downstream from a 90° bend, in cross section, 5*D downstream from the bend.

FIG. 4b shows the same disturbed flow profile, this time in the tube, or pipe, cross section 34. One can see that the flow is forced outwardly (here: upwardly) due to the centrifugal forces from the turn in the 90° bend. Then, the forced fractions move along the tube, or pipe, wall downwards 33a, where they combine and rise centrally upwardly 33b. These so-called secondary flows form, thus, a symmetric double vortex, which become especially strongly noticeable, when the ultrasonic beam passes exactly centrally vertically through the pipeline (line S).

If one directs an ultrasonic, measuring path through the particular flow profile of FIGS. 3 and 4, so that it extends, such as usual in the case of clamp-on systems, centrally through the pipe, then it becomes clear why the measurement error deviates negatively in the case of a disturbed flow profile in comparison to the undisturbed profile: In the case of the undisturbed profile, the sound passes through a clearly longer path portion, where $v_r/v_{average} \geq 1$, than in the case of the disturbed profile. This unequal distribution is a direct consequence of the continuity of the medium, which in the case of forcing of velocity fractions outwardly due to flow disturbances, leads to the fact that the regions with $V_r/V_{average} \geq 1$ are less in the total tube, or pipe, cross section than in the case of the undisturbed profile. This leads in the case of the disturbed flow profile (FIG. 4) then to a smaller travel-time difference and therewith to a smaller local flow velocity than in the case of the undisturbed, fully developed flow (FIG. 3), although the average flow velocity in both cases is identical.

Over the years, customers have been told to provide a certain run-in distance—such as shown in FIG. 1. This prescribed distance is necessary, in order to achieve the measurement accuracy specified for the device.

In an embodiment of the present invention, the customer then obtains the output of a compensated measured value as a function of, among other things, the run-in distance and the type of the disturbance, so that the distance to a disturbance causing, tube, or pipe, element, which is called the run-in distance, can be lessened. Associated with the lessening of the distance, there is typically an increasing of the measured value fluctuation, thus the standard deviation, because the disturbances vary with time. This disadvantage is, however, by far outweighed by the advantage of being able to install the ultrasonic, flow measuring system nearer to the disturbance, without increasing the average measurement error, especially when the space conditions of the installation do not permit the normally prescribed run-in distance.

The method will now, by way of example, be explained in greater detail.

Disturbances lead, dependent on disturbance type and on the distance to the disturbance, because of deviations from the ideal flow profile, to measurement errors, since a clamp-on, ultrasonic device is designed assuming that a fully developed, rotationally symmetric flow profile is present.

The arising measurement error must be ascertained once per disturbance type, distance, mounting angle and possibly, Reynolds number.

This is done either by complex measurements or by numerical simulation of the flow conditions at different distances after the disturbances and evaluation of the calculated velocity components, in the simplest case by average value formation of the velocity components along a fictive sound beam. As a result of this step, one obtains data, which tell how large the measurement error is, which would arise, when an ultrasonic device would be installed in the corresponding position. If this data is provided to an ultrasonic, flow device, then an option is to correct ($k_D$) the arising measurement error.

The ascertaining of the measurements occurs preferably in the plant or in a facility for calibration. The customer/user of the measuring device is not involved in this step.

In order to obtain an exact compensation of the measured flow or flow velocity, it is necessary that the customer provides the details of its particular measuring arrangement (distance, disturbance type, viscosity, . . . ). In the case of using a 90°, two path, two traverse arrangement or a 180°, two path, one traverse arrangement, the information regarding the mounting angle relative to the disturbance is not required, since in these cases, the angularly dependent measurement error fractions cancel one another.

With the help of this data and the data predetermined from the measurements or by simulation, the volume flow or the flow velocity is directly corrected. If required, the expected measurement error can additionally be displayed.

For ascertaining a measurement error, the following parameters must be predetermined or, in given cases, ascertained.
1. distance of the mounting position from the disturbance, respectively the disturbance causing, tube, or pipe, element,
2. type of the disturbance causing, tube, or pipe, element (elbow type, valve, pump, etc.), and
3. in given cases, the kinematic viscosity or the current Reynolds number of the medium.

The aforementioned parameters must be input into the measuring device or into a computer.

In a first embodiment of the invention, a factor $k_D$ is ascertained and the instantaneously ascertained flow corrected with the assistance of this factor.

For ascertaining the factor $k_D$, a data set of measurements is accessed, which was measured for respectively different disturbance causing, tube, or pipe, elements, for different distances to the respective disturbance causing, tube, or pipe, element and for different Reynolds numbers.

In a second embodiment of the invention, the ascertaining of the factors $k_D$ can be done using a certain simulation algorithm. This simulation can occur with the assistance of a CFD (computational fluid dynamics) program for different measured media, tube, or pipe, elements, run-in section, etc. By means of the CFD program, additionally flow profiles and therewith correction factors with reference to a current flow situation can be calculated on-site at the customer's plant. By average formation of the velocity components along the sound path, the occurring measurement error can be calculated and therewith a compensation of the measurement signal by the flow related measurement error achieved.

As one can recognize, among other things, from FIG. 4b, in the case of a one path arrangement, one of the decisive factors for the measurement error is the mounting orientation relative to the disturbance. By applying a two path correction and by accounting for the measured values of the two ultrasonic transducers pairs—for example, by average formation—this mounting orientation dependence of the ultrasonic transducer largely disappears. In this way, an orientation independent correction is enabled.

After ascertaining the correction factor $k_D$ either by accessing existing measurements or by simulation, a corrected volume flow can be ascertained. This occurs, for example, using the formula:

$$V_{corr} = k_D(w_1 V_1 + w_2 V_2), \text{ wherein}$$

$V_{corr}$=corrected volume flow
$k_D$=correction factor (as a function of distance, flow type and, in given cases, Reynolds number)
$V_1$=volume flow measured with the first ultrasonic transducer pair
$V_2$=volume flow measured with the second ultrasonic transducer pair
$w_1$=weighting factor for the first volume flow
$w_2$=weighting factor for the second volume flow The weighting factors of the volume flows are preferably 0.5.

If $w_1=0$ and $w_2=1$, then only channel 2 is taken into consideration, while, in the case of $w_1=1$ and $w_2=0$, only channel 1 is taken into consideration. With $w_1=w_2=0.5$, the two channels are equally weighted and this corresponds to forming the average. An unequal weighting can be appropriate in a special arrangement of the sensors relative to one another, e.g. when the recommended mounting angle of the sensor pairs relative to one another cannot be maintained, or, for example, after an extraordinary disturbance.

The determination of the correction factor can be displayed both by a display unit connected with the evaluation unit of the measuring device or alternatively by a display connected with the computer unit.

Finally, the correction factor can be applied for compensating the measurement signal.

For ascertaining the correction factor $k_D$, a 180° one traverse arrangement—such as shown in FIG. 2 variant B—or a 90° two traverse arrangement—such as shown in FIG. 2 variant A, prove to be especially suitable. In the case of these arrangements, the asymmetries of the flow profile are best registered and cancelled.

In principle, in the case of ascertaining the correction factor $k_D$, also a dependence on the Reynolds number can be taken into consideration. Measurements have shown that this influence only occurs in greater measure in the case of Reynolds numbers <85,000. For correcting this effect, one can calculate the current Reynolds number, for example, via the current velocity and kinematic viscosity. Alternatively, the current Reynolds number can also be measured using a corresponding measuring device, for example, a Coriolis meter.

In order to perform a correction as a function of Reynolds number, preferably the corresponding correction data should be present, i.e. the arising measurement error must either be measured in the case of these Reynolds numbers or ascertained by means of simulation. If the kinematic viscosity is known during the measuring, then one can calculate the Reynolds number via the velocity and the inner diameter of the tube, or pipe. With knowledge of the Reynolds number, disturbance type and distance, the correction factor can be exactly determined.

This can occur both in the display unit of the ultrasonic, flow measuring device or in the computer. This is independent of the correction of the volume flow and depends only on the expected measurement errors.

The parameters input to the computer can be processed by a computer program product. This enables simulation of the measuring conditions taking into consideration the arrangement of the ultrasonic transducers at the measuring point. This computer program product can be embodied as an app and facilitate for the user the buy decision for the concrete case of application.

The effects of different traverse mounts and the ascertained correction factor $k_D$ will now be explained in greater detail on the basis of FIGS. 5-11.

The measurement results illustrated in FIGS. 5-11 were ascertained with the clamp-on, ultrasonic, flow measuring device, "Prosonic Flow 93 P", of the applicant on a pipe of nominal diameter DN 80. Placed in front of all measuring paths was a three-stage, perforated plate, flow straightener. Used as disturbance forming element was either a 90° bend or two sequentially arranged, 90° bends, of which one was rotated 90° with respect to the other (a so-called double, out of plane elbow). The ultrasonic transducers were arranged on a vertically extending pipe section, located before which was the disturbance forming element. This element formed the transition from a 20*DN long horizontal pipe section to the mentioned vertical pipe section. The measured medium was tap water. The temperature amounted to 20° C. and was controlled to a variance of max. 0.1° C. from measurement to measurement. The measurements were performed at a constant frequency of the ultrasonic signals.

The constant frequency lies, in such case, preferably in a range between 1-3 MHz. The flow amounted to a constant 20 l/s.

Figure 5:
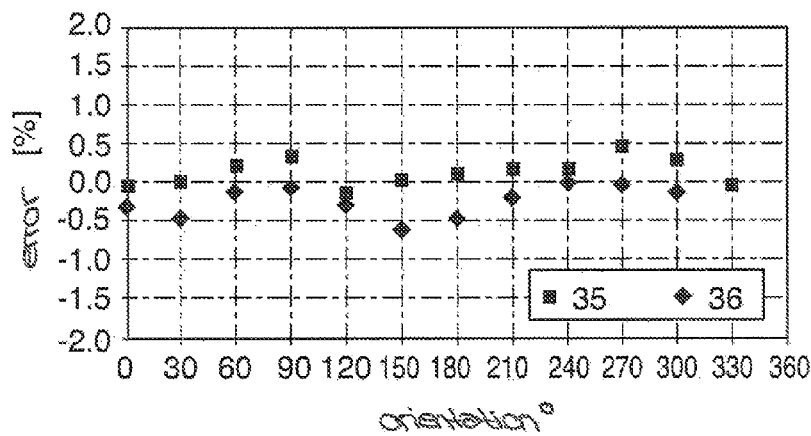
FIG. 5 shows measurement curves of two individual, independent, two traverse arrangements of ultrasonic transducer pairs in the case of progressive changing of the angular orientation by 30° after 40 DN of straight measuring path.

FIG. 5 shows measurements of flow, respectively deviations from a master flow measuring device, after 40*DN of straight measuring path downstream from a three-stage, perforated plate, flow straightener, this corresponding in the case of a nominal diameter of DN=80 mm to a distance of 3200 mm. The measuring arrangement was a two path, two traverse arrangement (variant A—FIG. 2).

The ultrasonic, clamp-on sensor arrangement was rotated with 30°-offset per measuring point 360° around the pipe axis. As can be seen from the measurement results, this leads to a measurement error of about ±0.5%. The two measuring signals per measuring point are for the two measurement channels, thus one signal from each ultrasonic transducer pair. One can see that even in the case of a very large distance from the disturbance, no completely symmetric flow profile is present.

FIG. 5 provides a reference measurement for a two path, two traverse system in the case of a run-in distance of 40*DN. Similar measurement errors, for instance, ±0.5% were also observed for two path, one traverse systems under analogous measuring conditions and analogous run-in distance.

Figure 6:
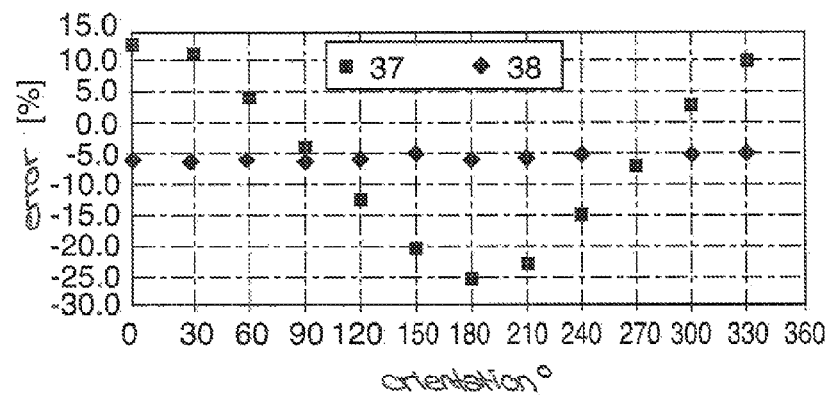
FIG. 6 shows measurement curves of a single path, one traverse arrangement and a 180°, two path, one traverse arrangement in the case of progressive changing of the angular orientation by 30° at a distance of 5 DN downstream from a 90° bend.

FIG. 6 shows in measurement curve 37 an error determination—thus the deviation of the measured flow compared with the actually existing flow. The individual measurement points of measurement curve 37 were ascertained by orbiting the ultrasonic transducer arrangement by increments of 30° along the pipe circumference. The measuring arrangement was a single path, one traverse arrangement with a disturbance causing element in the form a 90°-elbow, a flow of 20 Vs and a constant distance of the measuring arrangement of 5*DN (five times nominal diameter) from the disturbance causing element. All additional conditions were analogous to the measuring conditions of the reference measurement in FIG. 5. In the case of the one path measuring, one detects a high negative measurement error, for instance, −25% at an orientation of 180°. As a whole, measurement error values ranged between +12% and −25%. As can be seen, the measurement error, respectively the measurement uncertainty, in the case of constant distance from the disturbance, is strongly dependent on the mounting position of the ultrasonic transducer along the pipe circumference.

Measurement curve 38 shows an error determination using a two path, one traverse arrangement (such as in variant B FIG. 2 with sensors offset relative to one another by 180°). In such case, supplementally to the first measurement curve of the first ultrasonic measuring pair, that of the second ultrasonic measuring pair, respectively the therewith ascertained values, was/were applied for compensation of the measurement error. In such case, the signal of the first ultrasonic transducer pair and the signal of the second ultrasonic transducer pair are taken into consideration by forming their average. After accounting for the two measuring paths, a comparatively constant measurement error can be ascertained—such as evident from measurement curve 38. This comparatively constant measurement error can be used for the subsequent calculating of the correction factor $k_D$. This constant measurement error is subject for these arrangements of ultrasonic transducers usually to a fluctuation of, for instance, ±0.5 to ±1% and lies in the present example of an embodiment on average at, for instance, −6%.

Figure 7:
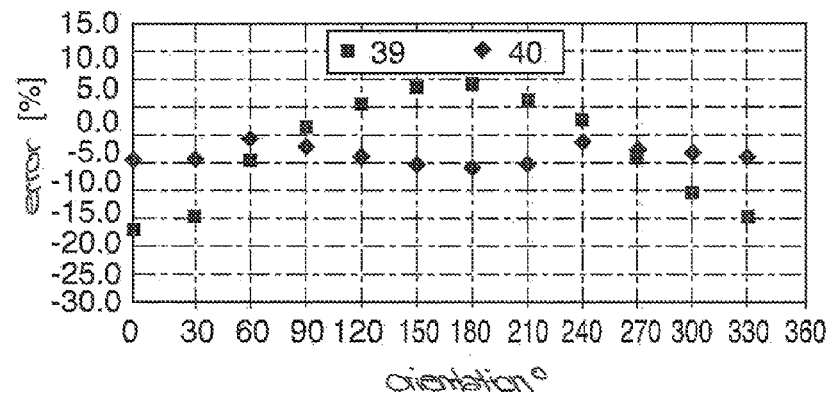
FIG. 7 shows measurement curves of a single path, one traverse arrangement and a 180°, two path, one traverse arrangement in the case of progressive changing of the angular orientation by 30° at a distance of 5 DN downstream from a double 90°, out of plane elbow.

FIG. 7 shows a measurement curve 39 with an error determination for a single path, one traverse measuring after a double, out of plane elbow, thus two upstream 90° bends in two planes perpendicular to one another, for example, a horizontal bend and a vertical bend. The distance from the disturbance amounts to 5*DN. All additional measurement parameters are analogous to the measuring arrangement described in FIG. 6. As one detects from FIG. 7, measurement curve 39 has a maximum positive error of about 5%. Measurement curve 40 represents the rotation angle dependent, measurement error for a two path, one traverse measuring, in the case of which, again, the signal of the first ultrasonic transducer pair and the signal of the second ultrasonic transducer pair were taken into consideration by averaging with one another. As one also in this case detects, the additional measurement data of the second ultrasonic transducer pair permits a good compensation of the fluctuating measured value of the first ultrasonic transducer pair at a measurement error of −5% with a fluctuation of ±2%.

Figure 8:
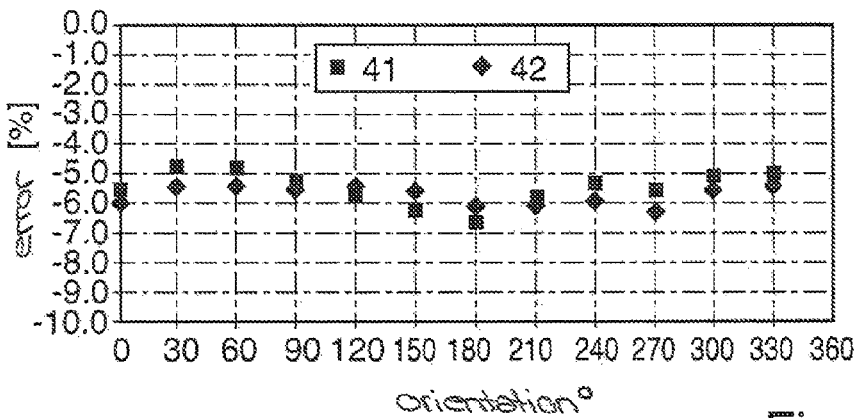
FIG. 8 shows measurement curves of a single path, two traverse arrangement and a 90°, two path, two traverse arrangement in the case of progressive changing of the angular orientation by 30° at a distance of 5 DN downstream from a 90° bend.
Figure 9:
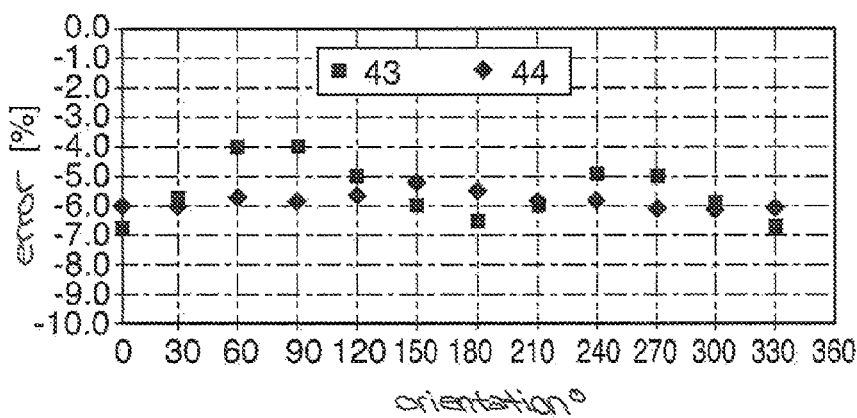
FIG. 9 shows measurement curves of a single path, two traverse arrangement and a 90°, two path, two traverse arrangement in the case of progressive changing of the angular orientation by 30° at a distance of 5 DN downstream from a double 90°, out of plane elbow.

The measurement curves of FIGS. 8 and 9 were in comparison to FIGS. 6 and 7 made using analogous measuring conditions, however, in each case, by means of a two traverse arrangement. In such case, applied in FIG. 8 as disturbance causing element was a 90° elbow and in FIG. 9 a double, out of plane elbow. The distance from the disturbance was, in each case, 5*DN. In such case, measurement curves 41 and 43 each represent the error curve in the case of a single path, two traverse arrangement and measurement curves 42 and 44 the averaged error curve taking into consideration the measurement results of the second measuring path, respectively the second ultrasonic transducer pair in the case of a two path, two traverse arrangement. The arrangement of the second measuring path is offset by 90° relative to the first. Measurement curve 42 of FIG. 8 shows a measurement error of, on average, for instance, −6%. The measurement curve 44 shown in FIG. 9 shows an average measurement error of, for instance, −5.5%.

Measurement curves 41 and 43 of the one path measurements of the two traverse arrangement have an essentially smaller measurement error fluctuation than the one path measurements of the one traverse arrangement. This relates to the compensating effect of the two traverse arrangement with its once toward and then back traveling sound beam, in the case of which velocity components extending transversely to the flow largely cancel one another due to their counter directional registering.

Figure 10:
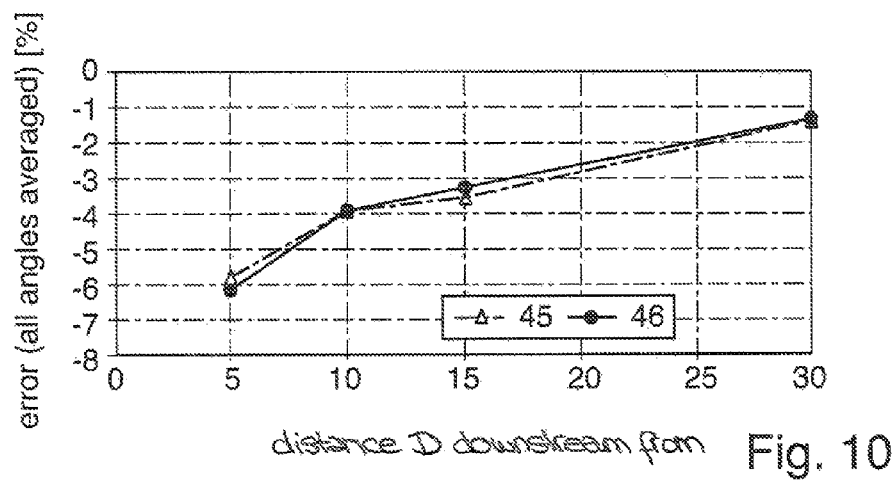
FIG. 10 shows graph of the measurement error averaged over all orientation angles versus the distance from the disturbance in the case of a 90°, two path, two traverse arrangement and in the case of a 180°, two path, one traverse arrangement.

FIG. 10 shows measurement error averaged from the single values of the measurement error over all orientations (offset angular positions around the pipe) as a function of the distance from the disturbance causing element. This graph relates to the measurement results in the case of a 90°-elbow, wherein curve 45 is for a two path, two traverse arrangement and curve 46 for a two path, one traverse arrangement. These error values or therefrom derived $k_D$-values can be made available to customers.

Figure 11:
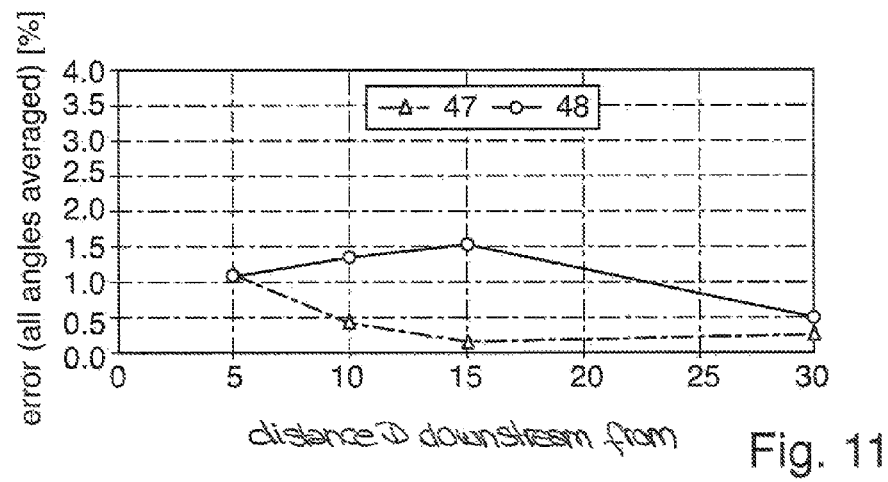
FIG. 11 shows a graph of the measurement error scatter averaged over all orientation angles versus the distance from the disturbance, in the case of a 90°, two path, two traverse arrangement and in the case of a 180°, two path, one traverse arrangement.

The graph in FIG. 11 shows variation of the measurement error in the case of different run-in sections, respectively distances, from the disturbance. This value is important, in order to describe the scattering, respectively measurement error fluctuation, of the measurement error ascertained in FIG. 10. The curve 47, in such case, is for a two path, two traverse arrangement and the curve 48 is for a two path, one traverse arrangement. This value is preferably presented supplementally to the $k_D$ value, in order to provide customers with an evaluation as regards the reliability of the measurement error.

A typical input by a customer would be e.g.
arrangement of the ultrasonic transducer: two traverse system
distance from the disturbance: 10*DN
type of disturbance: 90° elbow
response of system: the average measurement error, respectively measurement uncertainty, averaged over all orientations, lies in the case of the aforementioned conditions at −4% with a measurement error fluctuation, respectively variation of the measurement error, of ±0.5%

The correction factor $k_D$ amounts to: 1.04167 (=100/(−4+100)), wherein the correction factor compensates the expected measurement error Calculating $k_D$ in general: $K_D$=100/(medium measurement error[%]+100).

The above mentioned values can be read from the curves 45 and 47 of FIGS. 10 and 11.

Other measurement results have shown that in the case of Reynolds number Re <85,000 with one- or two traverse systems, the averaged measurement error decreases slightly.

Since not all angular orientations—such as evident from FIGS. 5-11—can be measured, intermediate values e.g. a 19° angle to the flow disturbance, can be approximated to the real conditions by interpolation from two measured values.

FIG. 12 shows an input screen, such as displayed either in an app, in a computer, or in a measuring device, by an output unit—e.g. a display.

The fields 71-73 are simple input elements, respectively signal key sequences, for individual parameter entries by users/customers. Field 74 shows the decision point for selection of the output of a measurement error and, in given cases, its correction. This menu point can be named e.g. "Enhanced Flow Correction". The menu point "Enhanced Flow Correction" includes different menu subpoints. The menu subpoints correspond to the earlier mentioned parameters, which the customer must input.

The parameters can be manually input or embodied as a drop-down menu.

Label 76 references the run-in distance, respectively the distance of the measuring arrangement from the disturbance, thus e.g. 10*DN or 1 m in the case of a pipe with an inner diameter of 100 mm. This can be input in box 80.

Label 77 references the disturbance type. Thus, e.g., 90° bend, 2×90° elbow with bends in one plane, 2×90° out of plane elbow, etc. These submenu points can be embodied, for example, also as drop-down fields.

Thus, field 81 can be, for example, a 90° bend, field 82 a 2*90° elbow with two bends in one plane, field 83 a pump and field 84 can provide other options.

Label 78 provides the submenu "Kinematic Viscosity". In box 85, the corresponding kinematic viscosity of the medium can be entered.

Label 79 references the submenus "Ultrasonic Transducer Arrangement". Here, one can select whether a 180°, two path, one traverse, or a 90°, two path, two traverse, arrangement of the ultrasonic transducer pairs is present. The input options 86 and 87 reference the two selection possibilities and can be selected by a user.

This submenu point 79 could also be omitted, to the extent that the arrangement is predetermined at another point, e.g. a particular sensor configuration is being used for the application.

The submenu complex 75 with the labels 76-79 can, for example, likewise be embodied as a drop-down menu, already provided on the display or opened as a separate window.

The earlier described measurement results were performed for two path measurements, thus for measurements with two ultrasonic transducers pairs. It is, however, also possible to arrange more than two ultrasonic transducers pairs circumferentially displaced relative to one another.

Also, a measuring with only one ultrasonic transducer pair is possible, however, for this the angular orientation of the ultrasonic transducer pair on the pipe is required, in order to enable a calculating of the correction factor.

This dependence on the angular orientation of the ultrasonic transducer pair can be compensated in the case of two- or multipath measurements by ascertaining the second measurement signal, respectively the second measuring path and conforming the measurement errors with one another.

The invention claimed is:

1. A method for ascertaining a compensated flow and/or a compensated flow velocity, wherein the compensation of a flow related measurement error occurs in the context of a flow measurement with a two path measuring of an ultrasonic, flow measuring device comprising an arrangement of at least two ultrasonic transducers pairs on a tube, or pipe, wherein the ultrasonic transducers are in a 180°, two path, one traverse, or a 90°, two path, two traverse arrangement, by means of an evaluation unit of a flow measuring device and/or a computer, comprising steps as follows:
  a) feeding information relative to the type of a flow influencing, tube, or pipe, element into the evaluation unit and/or into the computer;
  b) feeding information relative to distance of the arrangement of the ultrasonic transducer pairs from the flow influencing, tube, or pipe, element into the evaluation unit and/or into the computer;
  c) compensating a measurement error by means of a correction factor $k_D$ as a function of information from steps a) and b); and
  d) ascertaining a flow corrected by the correction factor $k_D$ and/or a flow velocity corrected by the correction factor $k_D$, wherein:

with using a 180° one traverse arrangement or a 90° two traverse arrangement asymmetries of a flow profile are best registered and cancelled with the help of the formula $$V_{corr}=k_D(w_1V_1+w_2V_2),$$

wherein $V_{corr}$=corrected volume flow $k_D$=correction factor (as a function of distance, flow type and in given cases Reynolds number)

$V_1$=volume flow measured with a first ultrasonic transducer pair $V_2$=volume flow measured with a second ultrasonic transducer pair $w_1$=weighting factor for the first volume flow $w_2$=weighting factor for the first volume flow.

2. The method as claimed in claim 1, wherein:
a 180°, one traverse arrangement or a 90°, two traverse arrangement is utilized, especially in the form of a mounting arrangement, for ascertaining the correction factor $k_D$.

3. The method as claimed in claim 1, further comprising the step of:
calculating of a corrected volume flow as a function of the correction factor $k_D$ occurs.

4. The method as claimed in claim 1, wherein:
a calculating of a measurement uncertainty occurs as a function of information from steps a) and b).

5. The method as claimed in claim 1, wherein:
a feeding of information relative to Reynolds number and/or kinematic viscosity of a medium to be measured into the evaluation unit and/or into the computer occurs; and
such information is utilized in ascertaining the correction factor $k_D$.

6. The method as claimed in claim 1, wherein:
exclusively the type of flow influencing, tube, or pipe, element and the distance of the arrangement of the ultrasonic transducer pairs from the flow influencing, tube, or pipe, element, as well as optionally the information relative to the Reynolds number and/or the kinematic viscosity of a medium to be measured are taken into consideration for ascertaining the correction factor $k_D$.

7. The method as claimed in claim 1, wherein:
especially as claimed, no knowledge as regards orientation of the ultrasonic transducer pairs relative to the disturbance is required for ascertaining the correction factor $k_D$.

8. The method as claimed in claim 1, wherein:
in the case of application of at least two ultrasonic transducers pairs the influence of angular orientation of a first ultrasonic transducer pair on the tube, or pipe, on the measurement result is compensatable by measurement results of one or more additional ultrasonic transducer pairs.

9. The method as claimed in claim 1, wherein:
there occurs a feeding of information relative to the arrangement of the ultrasonic transducer pairs relative to one another on the tube, or pipe, especially information as regards the angle of the ultrasonic pairs relative to one another;
wherein the vertex of the angle is arranged on the tube, or pipe, axis, and/or information as regards the number of traverses of an ultrasonic signal between the ultrasonic transducers of an ultrasonic transducer pair; and
such information enters into the ascertaining of the correction factor $k_D$.

10. The method as claimed in claim 1, wherein:
ascertaining the correction factor $k_D$ occurs by a simulation method.

11. The method as claimed in claim 1, wherein:
ascertaining of the correction factor $k_D$ occurs by comparison of the fed-in information with measurements, which are furnished in a data memory of the ultrasonic, flow measuring device, or in a data memory of the computer or which can be queried from a server.

12. The method as claimed in claim 11, wherein:
the comparison includes an interpolation of measurement data, to the extent that measuring conditions in the measurements do not completely correlate with fed-in information.

13. The method as claimed in claim 1, wherein:
the type of the disturbance causing, tube, or pipe, element is selected from the following group: angular tube, or pipe, elbow, especially with a 90° bend or a double or more, out of plane elbow, pumps, sensor elements, valves, and/or tube, or pipe, taperings or expansions.

14. The ultrasonic, flow measuring device, comprising:
an evaluation unit; and
at least two ultrasonic transducer pairs, which are arranged on a tube, or pipe, wherein:
said ultrasonic transducers are in a 180°, two path, one traverse or a 90°, two path, two traverse arrangement; wherein
said evaluation unit is embodied for ascertaining a measurement error compensated, measured value for a multipath measuring, especially by means of a method for ascertaining a compensated flow and/or a compensated flow velocity, wherein the compensation of a flow related measurement error occurs in the context of a flow measurement with a two path measuring of an ultrasonic, flow measuring device comprising an arrangement of at least two ultrasonic transducers pairs on a tube, or pipe, wherein the ultrasonic transducers are in a 180°, two path, one traverse, or a 90°, two path, two traverse arrangement, by means of an evaluation unit of a flow measuring device and/or a computer, comprising steps as follows: a) feeding information relative to the type of a flow influencing, tube, or pipe, element into the evaluation unit and/or into the computer; b) feeding information relative to distance of the arrangement of the ultrasonic transducer pairs from the flow influencing, tube, or pipe, element into the evaluation unit and/or into the computer; c) compensating a measurement error by means of a correction factor $k_D$ as a function of information from steps a) and b); and d) ascertaining a flow corrected by the correction factor $k_D$ and/or a flow velocity corrected by the correction factor $k_D$, which comprises the steps of:
wherein the ascertaining includes steps as follows:
a) feeding information relative to the type of a disturbance causing, tube, or pipe, element into the evaluation unit and/or into the computer;
b) feeding information relative to distance of the arrangement of the ultrasonic transducer pairs from the disturbance causing, tube, or pipe, element into the evaluation unit and/or into the computer;
c) ascertaining a correction factor $k_D$ as a function of information from steps a) and b); and
d) ascertaining a flow corrected by the correction factor $k_D$ and/or a flow velocity corrected by the correction factor $k_D$, wherein:

with using a 180° one traverse arrangement or a 90° two traverse arrangement asymmetries of a flow profile are best registered and cancelled with the help of the formula $$V_{corr} = k_D (w_1 V_1 + w_2 V_2),$$

wherein
$V_{corr}$ = corrected volume flow
$k_D$ = correction factor (as a function of distance, flow type and in given cases Reynolds number)
$V_1$ = volume flow measured with a first ultrasonic transducer pair
$V_2$ = volume flow measured with a second ultrasonic transducer pair
$w_1$ = weighting factor for the first volume flow
$w_2$ = weighting factor for the first volume flow.

15. The ultrasonic, flow measuring device as claimed in claim 14, wherein:
said flow measuring device is embodied as a clamp-on, ultrasonic, flow measuring device.

16. The computer program product for ascertaining a correction factor $k_D$ for a two path measuring, wherein the ascertaining includes steps as follows:
a) feeding information relative to the type of a disturbance causing, tube, or pipe, element into the evaluation unit and/or into the computer;
b) feeding information relative to distance ($x_a - x_d$) of the arrangement of the ultrasonic transducer pairs from the disturbance causing, tube, or pipe, element into the evaluation unit and/or into the computer; and
c) ascertaining a correction factor $k_D$ as a function of information from steps a) and b), wherein:
with using a 180° one traverse arrangement or a 90° two traverse arrangement asymmetries of a flow profile are best registered and cancelled with the help of the formula $$V_{corr} = k_D (w_1 V_1 + w_2 V_2),$$

wherein
$V_{corr}$ = corrected volume flow
$k_D$ = correction factor (as a function of distance, flow type and in given cases Reynolds number)
$V_1$ = volume flow measured with a first ultrasonic transducer pair
$V_2$ = volume flow measured with a second ultrasonic transducer pair
$w_1$ = weighting factor for the first volume flow
$w_2$ = weighting factor for the first volume flow.

* * * * *